US006915988B2

(12) United States Patent
Sanz et al.

(10) Patent No.: US 6,915,988 B2
(45) Date of Patent: Jul. 12, 2005

(54) MATRIX WINDOW

(75) Inventors: Eduardo Sanz, San Antonio, TX (US); Gilbert Moreno, San Antonio, TX (US)

(73) Assignee: MSA Aircraft Products, Ltd., San Antonio, TX (US)

( * ) Notice: Subject to any disclaimer, the term of this patent is extended or adjusted under 35 U.S.C. 154(b) by 0 days.

(21) Appl. No.: 10/765,527

(22) Filed: Jan. 27, 2004

(65) Prior Publication Data

US 2004/0262453 A1 Dec. 30, 2004

Related U.S. Application Data

(60) Provisional application No. 60/442,756, filed on Jan. 27, 2003.

(51) Int. Cl.$^7$ .................................................. B64C 1/14
(52) U.S. Cl. .................................... 244/129.3; 160/23.1
(58) Field of Search ................................ 160/23.1, 310; 244/129.3; 49/25; 359/609, 892

(56) References Cited

U.S. PATENT DOCUMENTS

| 4,815,515 | A | * | 3/1989 | Lee ............................. 160/23.1 |
| 5,372,173 | A | * | 12/1994 | Horner .......................... 160/98 |
| 6,227,491 | B1 | * | 5/2001 | Stephan et al. ............ 244/129.3 |
| 6,460,805 | B1 | * | 10/2002 | Sanz et al. ................. 244/129.3 |

* cited by examiner

Primary Examiner—Robert P. Swiatek
(74) Attorney, Agent, or Firm—Jackson Walker LLP

(57) ABSTRACT

Windows, including windows for an aircraft. The windows include a shade. The shade has variable light transmissive characteristics. The shade is entrained upon rollers so that it may roll across the lens window. The parts of the shade are nearly opaque and other parts are nearly transparent. The result is a shade that has varying optical density depending upon the position of the hand operated rollers or shade positioning mechanism.

7 Claims, 10 Drawing Sheets

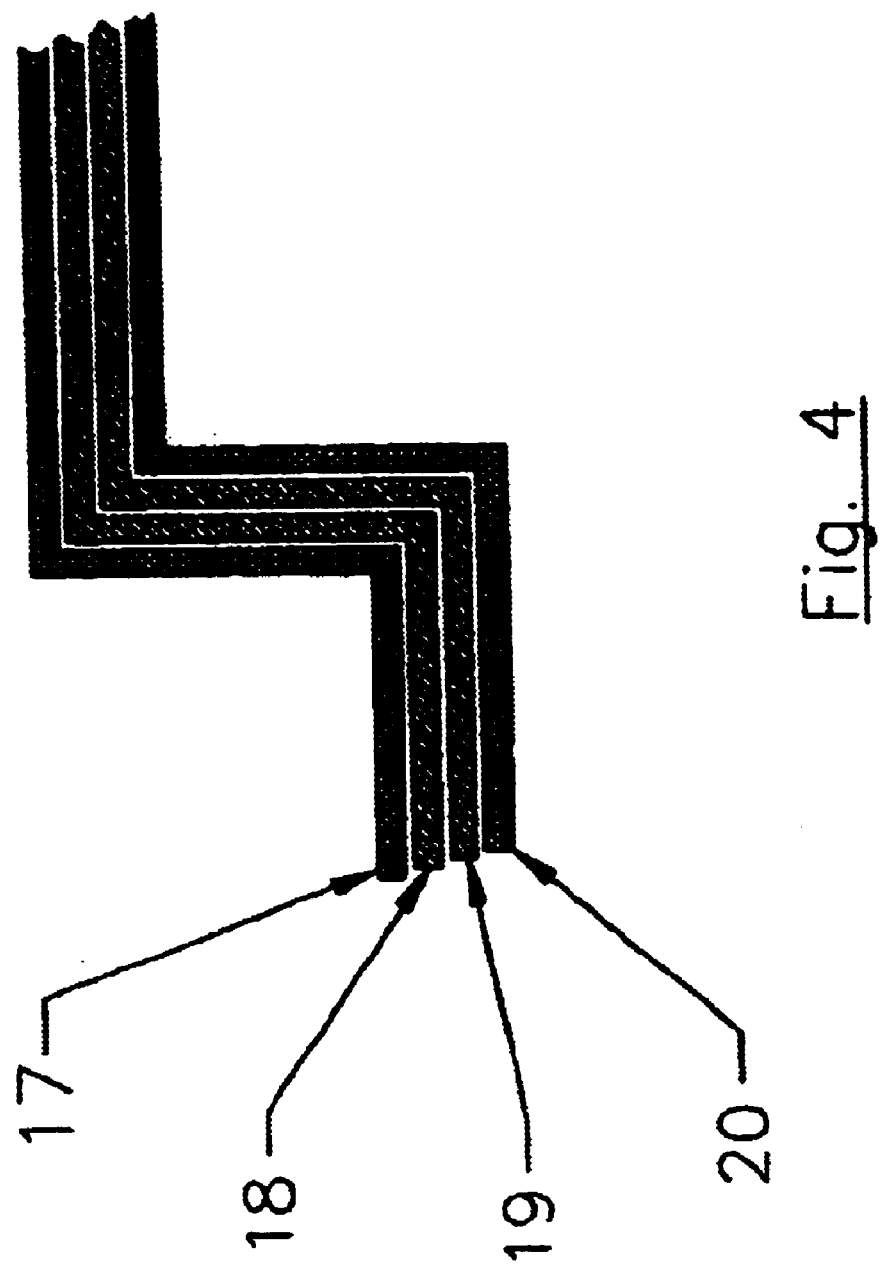

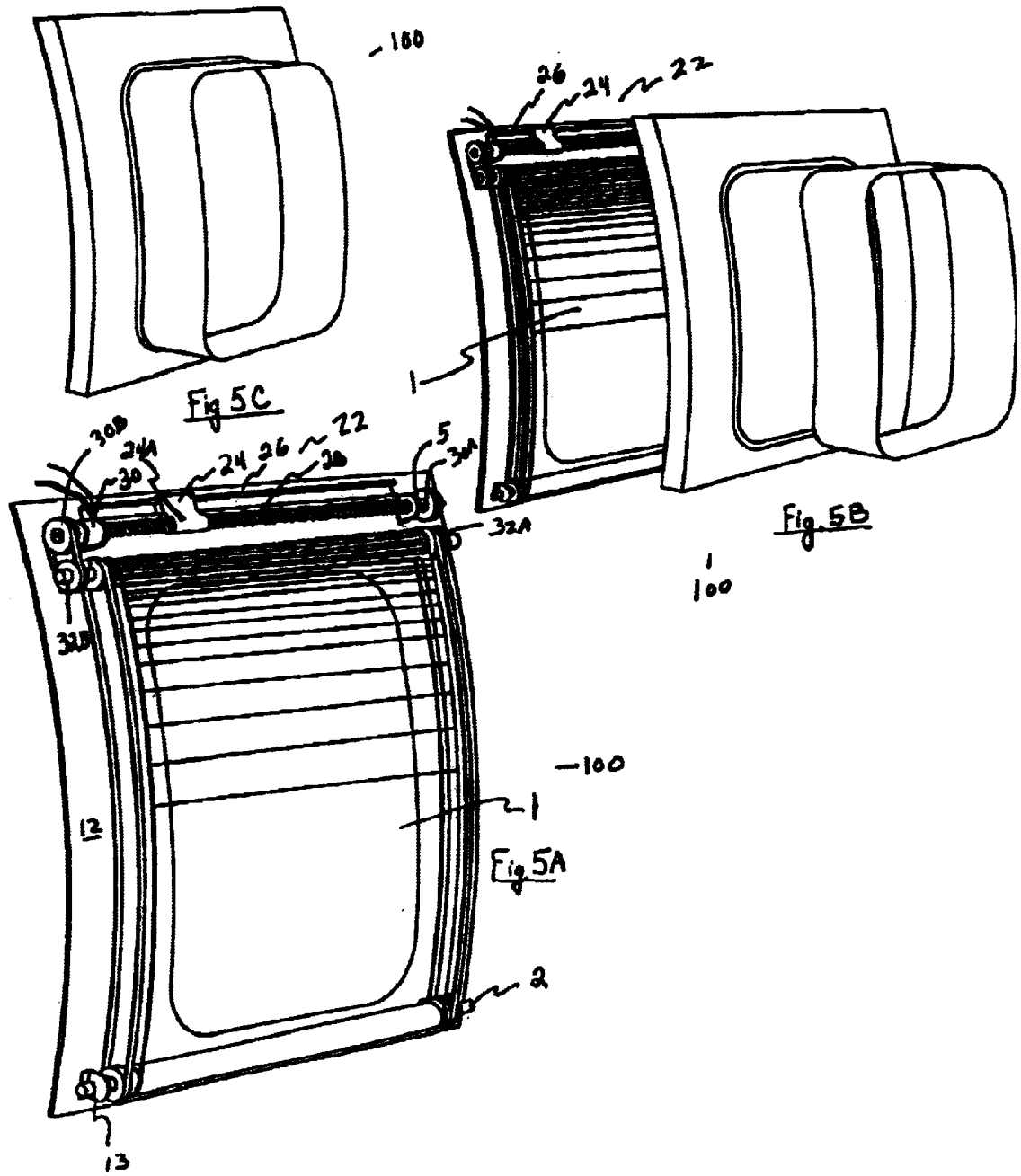

MATRIX WINDOW

This application claims priority from and incorporates by preference provisional application Ser. No. 60/442,756 filed Jan. 27, 2003.

FIELD OF THE INVENTION

Windows, including windows for an aircraft, the windows including a shade having variable light transmission characteristics.

BACKGROUND

Aircraft windows are known in the prior art to include opaque shades. The shade is usually drawn down across the window lens opening. Shades of this type may be found in patents such as: U.S. Pat. No. 6,481,486, U.S. Pat. No. 5,082,043 and U.S. Pat. No. 4,679,610.

Applicants provide, however, in an aircraft window, a shade that is comprised of an elongated, typically rectangular, rollable film or sheet having variable light transmissive ("VLT") characteristics, for example those made from G. E Lexan, photographic film, Mylar, acetate or other similar materials. The sheet is roller mounted and the rollers, including a drive roller and a take up roller, are either manually or electrically powered. Powering or moving the shade such that it moves across a lens opening of the window presents the operator with a choice of a clear film section, an opaque film section or a film section in which a gradient of varying optical density is provided that may, for example, make the shade darker at top (darker meaning greater optical density) and lighter at the bottom.

BRIEF DESCRIPTION OF THE DRAWINGS

FIG. 4 illustrates a composite material for use in a frame or reveal of an aircraft window.

FIGS. 5A, B and C illustrate the use of Applicants' novel variable optical density film with an alternate drive system which includes a slider for manual operation and electric motor for electric operation.

DETAILED DESCRIPTION OF PREFERRED EMBODIMENT

Figure 1:
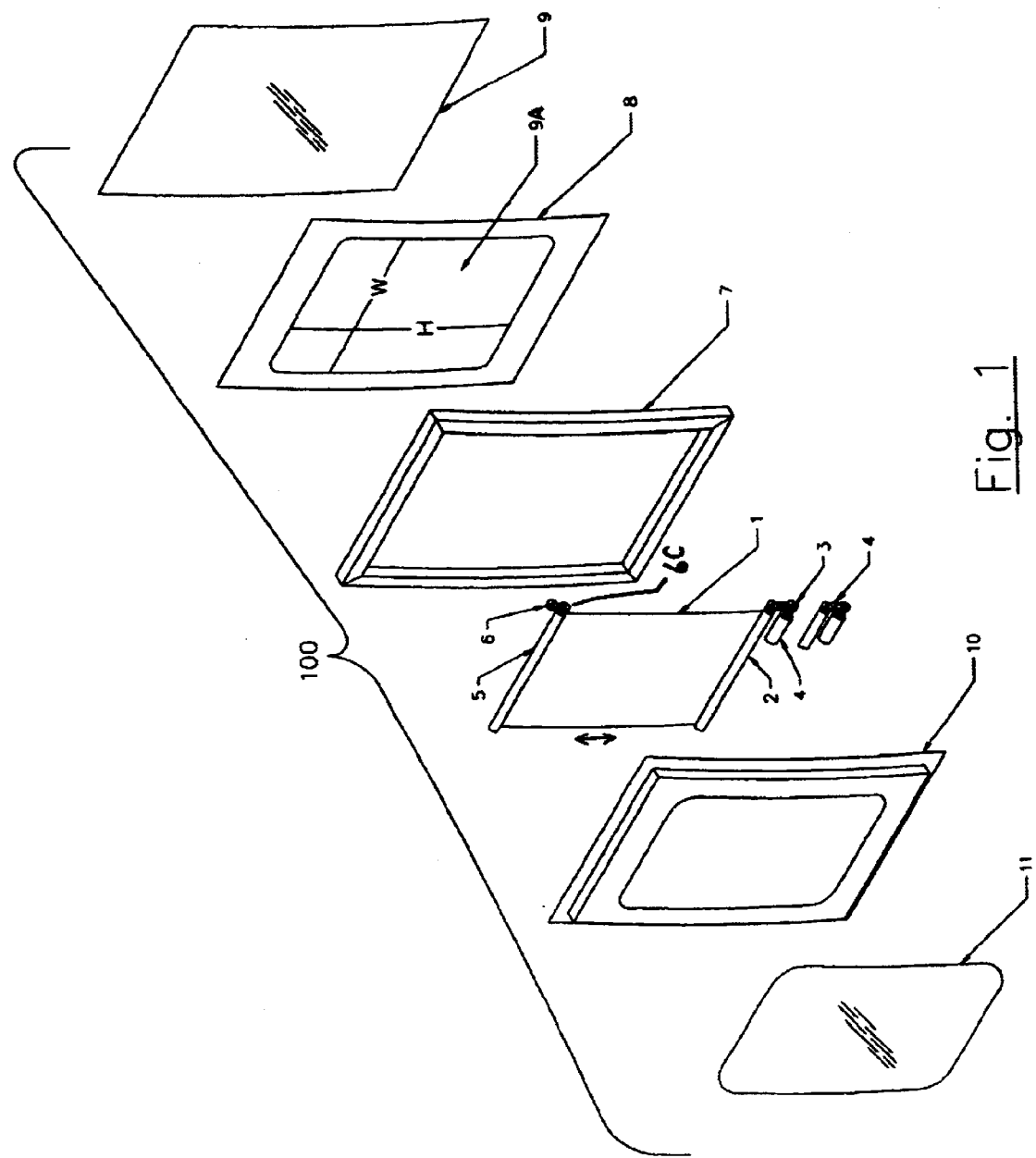
FIG. 1 illustrates an exploded window assembly using Applicants' novel sheet or film of varying optical density in perspective view.

Turning now to FIG. 1, Applicant is seen to provide an aircraft window (100) that is comprised of a variable optical clarity film or sheet (VLT sheet) 1. One end of the sheet is mounted to a lower roller (2) and the other end to an upper roller (5). The rollers are spaced apart, one above and one below a lens (9) having a lens opening (9A), which lens opening may be defined by a mask (8) and/or a reveal (10) having an inner perimeter thereon the lens opening with a height H and width W.

Figure 3:
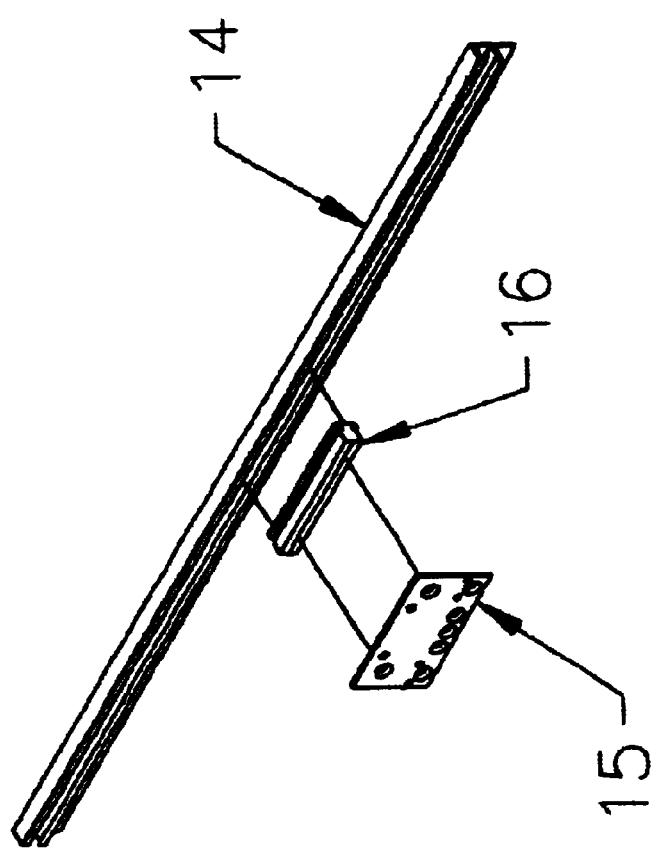
FIG. 3 illustrates a track or rail and slider mechanism for use in manually driving the rollers and the sheet of Applicants' present invention.
Figure 3A:
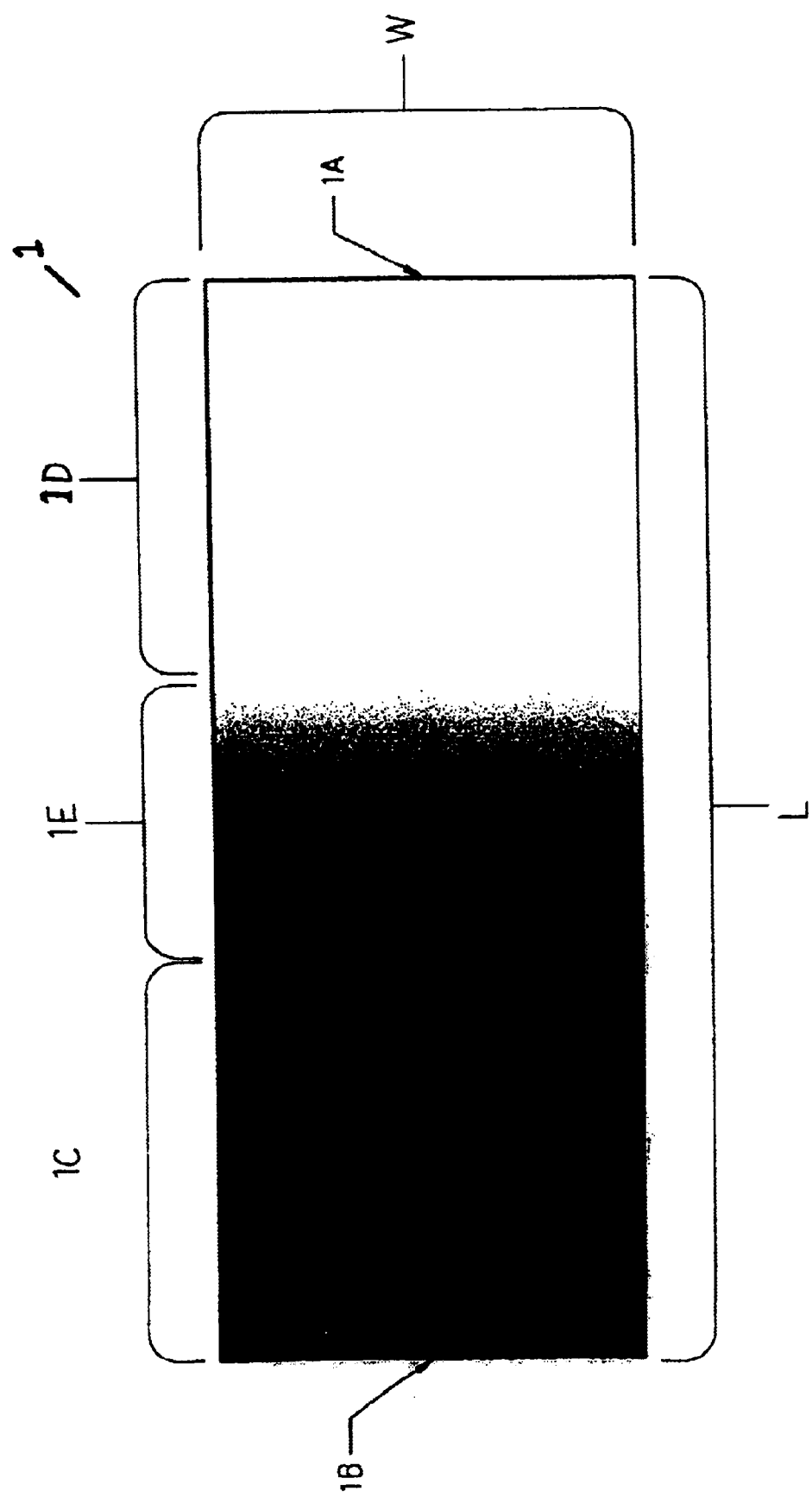
FIG. 3A illustrates the variable optical clarity or variable density film or sheet of Applicants' present invention ("VLT" sheets) apart from the remaining components of the window.

A VLT sheet rolled all the way up so only a transparent or near transparent portion of the sheet is adjacent the window will result in no depreciable diminishing of the light entering the cabin. FIG. 3A shows the shade may be completely rolled down with almost complete blockage of the light entering the cabin through the window. On the other hand, the shade rolled partly down shows that the shade exposed to the lens opening is optically denser in one area, for example at the top, and less dense in another area, for example at the bottom of the shade. Typically, the drop off of optical density is uniform.

This effect is achieved by using Applicants' novel shade as illustrated in FIG. 3A. Turning now to FIG. 3A, it is seen that Applicants' shade is typically rectangular and elongated having a longitudinal axis and a length L and width W. Applicants' novel shade (1) has a first end (1A) and a second end (1B). Adjacent the first end (1A) is a substantially clear or substantially optically transparent portion (1D). Adjacent the second end (1B) is an optically substantially opaque portion (1C). Between these two portions or sections is a section (1E) including an optical gradient from light to dark (proportions not to scale). Typically, the lighter area of section (1E) is adjacent clear section (1D) and the optically darker or more opaque area of section (1E) is adjacent opaque section (1C). The gradation may be created by using a dot matrix pattern.

Figure 8A:
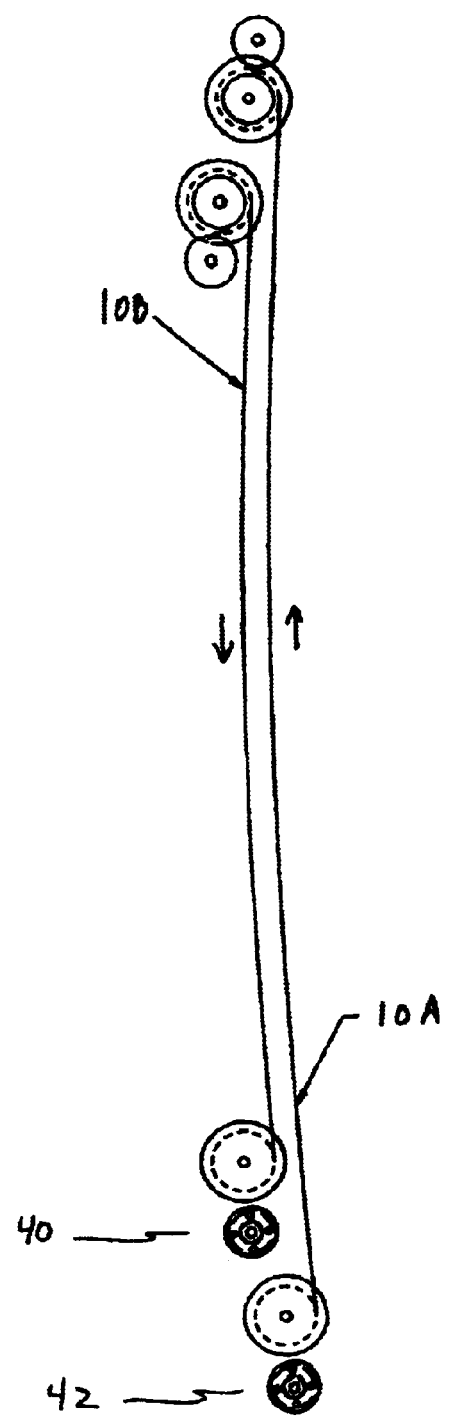
Figure 8B:
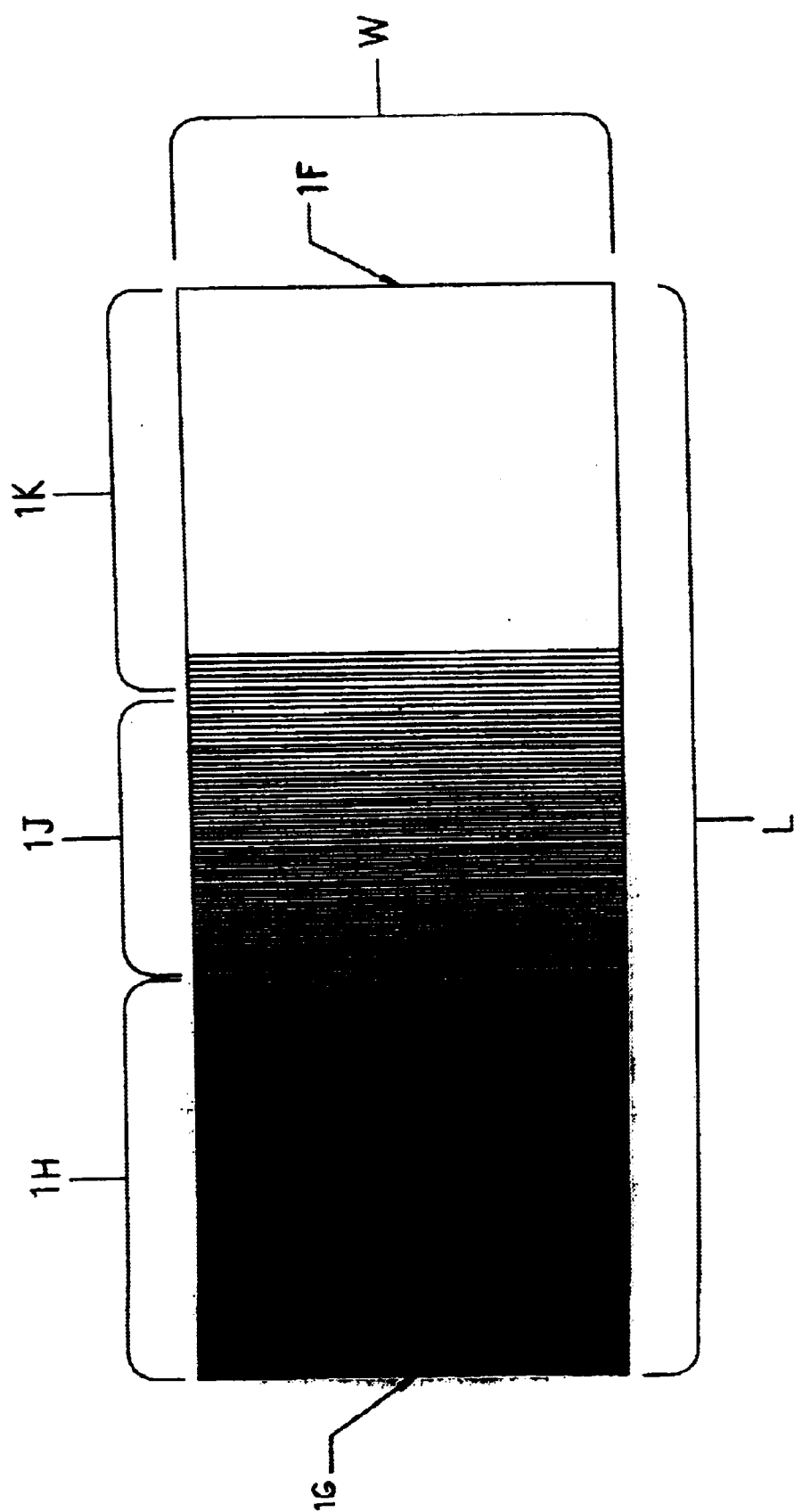
FIG. 8B illustrates an alternate gradation to that illustrated in FIG. 3B for the VLT sheet of Applicants' present invention.

FIG. 8B depicts an alternate gradation to that illustrated in FIG. 3A. The method of gradation illustrated in FIG. 8B utilizes the spacing of horizontal lines that are gradually spaced wider apart revealing more clarity the further apart they are placed.

Figure 2:
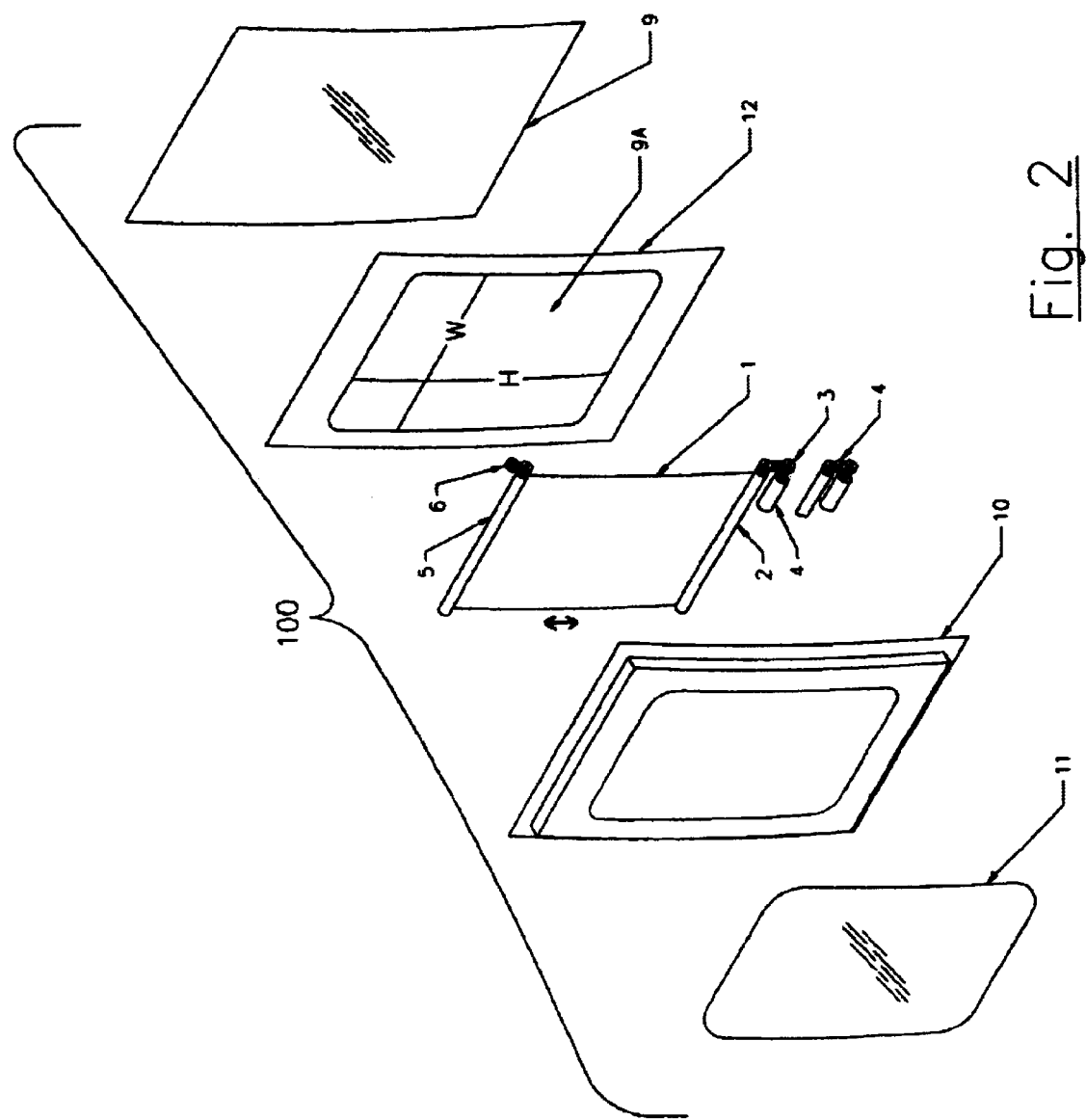
FIG. 2 illustrates the same basic window configuration as illustrated in FIG. 1 with the exception of the use of a panel in place of a frame.

The VLT sheet (1) has a width sufficient to cover the width of the lens opening and a length typically several times the height H of a lens opening (see also FIG. 2). Either of the rollers may be driven by a motor assembly such as belt drive motor assembly (3) or gear drive motor assembly (4) or a combination of gears and belts to drive one of the rollers, here lower roller (2) or, see FIG. 5A for alternate (manual) means of driving the rollers.

Figure 6A:
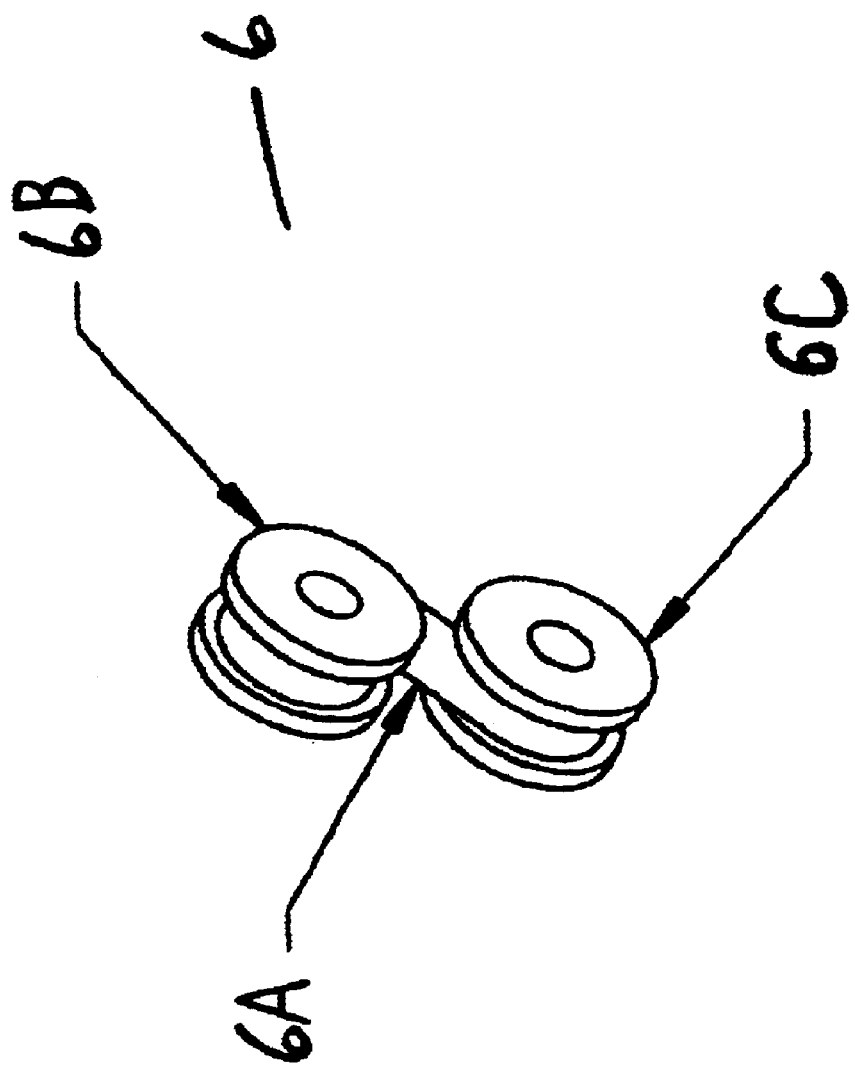
FIG. 6A illustrates a view of Applicants' retractable spring assembly.

A tension maintaining retractable spring assembly (6) (see also FIG. 6A) mounted opposite the motor assembly (or manual drive means) contains a coil spring (6A) mounted to a load wheel (6B) and an upper roller wheel (6C) which, when the motor assembly is powered will maintain tension in VLT sheet (1) while the motor draws the sheet down as it winds the sheet up on lower roller (2). When the user wants to roll the sheet up, retractable spring assembly (6), with a coil spring therein, has already been wound up and, a conventional switch (not shown) will disengage a lockout feature on the motor and allow the shade to roll up, so long as the switch is depressed. That is, the motor will power the lower roller (2) to pull the sheet down and, as it does will load up a coil spring of retractable spring assembly (6). When the motor stops, lockout feature will prevent the shade from rewinding on upper roller (5) through a lockout feature known in the art. However, a second conventional switch (not shown) may be depressed which will disengage the lockout feature and allow the sheet to roll up. In this manner, the sheet can be selectively positioned to provide for a preselected amount of light to enter the aircraft window.

Some of the other features illustrated in FIGS. 1 and 2 are common to presently known aircraft windows. These include a frame (7), mask (8) (FIG. 1), inner lens (9), reveal or cover (10), and second lens (11), which may be an outer lens attached to a reveal or cover (10) and inner lens (9) may be an inner lens with a mask (8) adjacent a perimeter thereof to mask some of the mechanical features of the invention. The mask and inner lens may be mounted to a frame (7) such as a rectangular aluminum frame. Upper and lower members of the frame may accept, by brackets or otherwise the retractable spring assembly (6) upper roller (5) (on an upper frame rail). A lower frame rail may accept the lower roller and the belt (3) or gear (4) driven motor assembly.

FIG. 2 illustrates an alternate embodiment of Applicants' aircraft window (100) including, instead of frame (7), a rigid panel (12), such as a panel made of a composite material or the like, which replaces the function of frame (7), and provides a place for mounting the rollers and motor assembly, switches, etc. Panel (12) may have an inner perimeter that defines an inner lens opening (9A). In yet another alternate preferred embodiment, the rollers belt assembly and related shade drive components may be mounted within the reveal or cover (10). Typically an outer lens is attached to the reveal or cover (10) so as to "sandwich" Applicants' novel roller driven VLT sheet between two lenses and provide a quiet, sanitary, dust free environment for the shade to move between an open and closed position. Further, the lenses, frames, reveals and panels that make up the window may be curved in side view so as to conform to the fuselage and interior of an aircraft.

As is apparent from FIGS. 1 and 2, the VLT sheet (1) is mounted such that the width of the VLT sheet W covers at least the width of the inner lens opening. Further, the longitudinal axis of the sheet is perpendicular to the longitudinal axis of the roller such that activation of the rollers moves the sheet between a position which provides optical clarity (section 1D) to the view through the inner lens opening to a position representing substantial opacity (section 1C).

FIG. 4 illustrates a composite buildup of various resin and impregnated cloths. They may be used in combination with each other to provide a finished part, such as a reveal or panel, with substantial weight savings and strength. They may be combined in any number of ways other than those illustrated in FIG. 4. The following is a list of the basic combination: 120/A glass (17); 901-carbon fiber (18); 901-carbon fiber (19); and 120/A glass (20). It is noted that the composite buildup illustrated in FIG. 4 may be used for any substantial components of an aircraft window, including reveal, reveal/frame combinations, reveal/frame and/or panel or any combinations thereof to provide a lightweight strong structure. Indeed, the composite, while available for use with Applicants' VLT sheet 1, may be used in any aircraft window to provide a light, strong window.

FIGS. 5A through 5C illustrate an alternate preferred embodiment of Applicant's present invention providing an alternate drive means (22) for moving the VLT sheet 1 from top to bottom and bottom to top across the window as set forth above. While any number of drive means can be provided, including drive means known in the art, Applicant's alternate drive means (22) includes a manually operated slider (24) mounted to a bracket (26) in ways known in the art, the slider including a passenger graspable (projecting through a slot on the front of the window) handle at one end and a lead screw engaging portion (24A) at the other, for engaging a rotary mounted lead screw (28). A switch operated electric motor (30) may be provided to operate the lead screw as on override. Rotation of lead screw via motor (30) or manual slider (24) will power drive wheels (30A) and (30B) at the removed ends of the lead screw. These drive a pair of driven wheels (32A) and (32B) so as to drive the upper roller and the lower roller. The structure may be mounted to a panel (12) or a reveal or a frame. Brackets 13 are provided at the removed ends of all rollers (in this and other embodiments disclosed) and on the lead screw to hold them to a support surface.

Figure 7A:
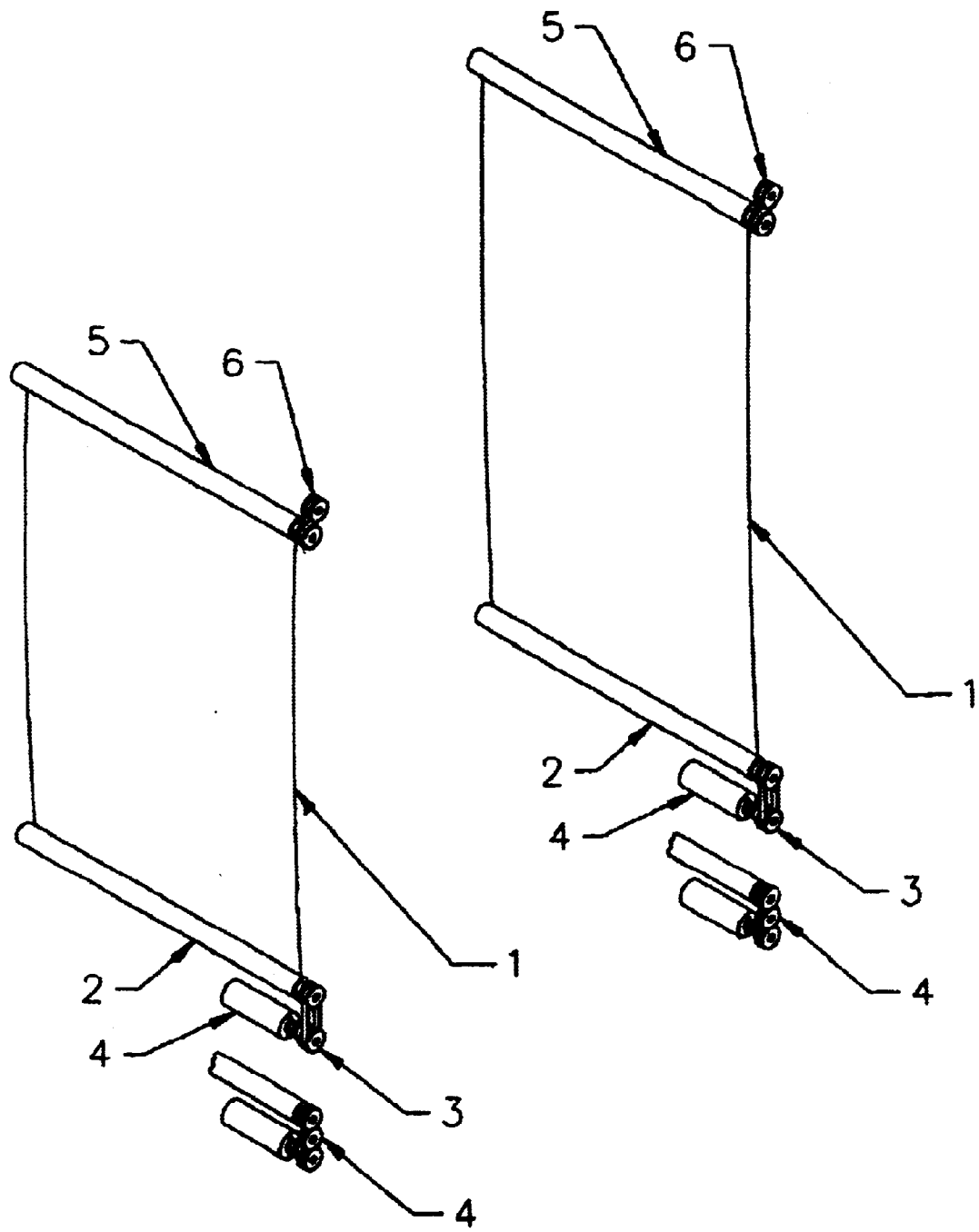
FIGS. 7A and 8A illustrate, in exploded perspective view and in side elevational view, an alternate preferred embodiment of Applicants' present invention which utilizes two pairs of rollers and two VLT sheets.

FIGS. 7A and 8A illustrate an alternate embodiment of Applicants' aircraft window (100), specifically the use of two sets of roller pairs, two motor assemblies (40/42), and two VLT shades (10A and 10B). This is so that a different effect of diminishing light in the aircraft cabin is accomplished. By using two films or shades electrically synchronized to move in opposite directions, the change of light passing through the window opening occurs in the center of the opening instead of from top to bottom as in the previously described embodiments. Independent electrical operation of the motor assemblies may also be provided in order to provide for a pleasing effect with light, dark and variations therebetween.

Other modifications include use of the window without an inner lens or a variety of known shade drive means.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

The status of the claims is as follows:

1. An aircraft window for mounting in an aircraft cabin, the aircraft window comprising:

a substantially transparent lens, having a lens opening, the lens opening having a width and a height;

support member for supporting the lens;

a shade, the shade comprising of flexible sheet or film having a first end and a second end and a body there between, the shade comprising of three sections, a first section adjacent the first end and substantially transparent, and a second section adjacent the second end and substantially opaque and a third section, between the first and second sections, the third section having an optical gradient varying from near transparency adjacent the first section to near opacity adjacent the second section, the sheet having a length and a width, the width of the sheet sufficient to cover the width of the lens opening;

at least one pair of rollers, one of the rollers attached to the first end of the sheet and the second of the pair of rollers attached to the second end of the sheet;

bracket to mount the rollers to the support member; and drive device for moving the shade between a first position where the first section covers the lens opening and a second position wherein the second section covers the lens opening.

2. The aircraft window of claim 1 wherein the shade comprises one or a combination of the following materials:

polycarbonate resin sheet material, photographic film, flexible synthetic film or acetate.

3. The aircraft window of claim 1 wherein the support member is curved in cross sectional view.

4. The aircraft window of claim 1 further including a second pair of rollers and a second shade.

5. The aircraft window of claim 1 wherein the drive device includes a lead screw and a handle.

6. The aircraft window of claim 1 wherein the drive device includes an electric motor.

7. The aircraft window of claim 1 further including a second transparent lens, the second transparent lens for engagement with the support member such that the shade, the at least one pair of rollers and the drive device are located between the transparent lens and the second transparent lens.

* * * * *